United States Patent [19]

Mayr et al.

[11] 4,110,909

[45] Sep. 5, 1978

[54] DEVICE FOR CLEANING OIL DIPSTICKS

[76] Inventors: Ernst Mayr, Am Lappenspring 5, 3320 Salzgitter 51; Heinz Langemeier, Harzstr. 24, 3394 Langelsheim, both of Fed. Rep. of Germany

[21] Appl. No.: 804,085

[22] Filed: Jun. 6, 1977

[51] Int. Cl.² ............................................ G01F 23/04
[52] U.S. Cl. .............................................. 33/126.7 R
[58] Field of Search .................. 33/126.7 R; 15/210 B

[56] References Cited

U.S. PATENT DOCUMENTS

| | | | |
|---|---|---|---|
| 1,976,434 | 10/1934 | Claus | 33/126.7 R |
| 2,029,672 | 2/1936 | Rankin | 33/126.7 R |
| 2,127,835 | 8/1938 | Tower | 33/126.7 R |
| 3,626,596 | 12/1971 | Manke | 33/126.7 R |

FOREIGN PATENT DOCUMENTS

| | | | |
|---|---|---|---|
| 1,090,791 | 4/1955 | France | 33/126.7 R |
| 1,023,599 | 1/1958 | Fed. Rep. of Germany | 33/126.7 R |
| 618,483 | 3/1961 | Italy | 33/126.7 R |

Primary Examiner—Charles E. Phillips
Attorney, Agent, or Firm—Salter & Michaelson

[57] ABSTRACT

An oil dipstick for use in measuring the oil level in an oil receptacle such as the crankcase of an automotive vehicle, including an elongated rod that is received in a wiping member in frictional contact therewith and is movable outwardly of the crankcase relative to the wiping member, wherein oil is removed therefrom by contact with the wiping member. A locking member is secured to the rod and is engageable with the wiping member for selectively locking the wiping member to the rod, so that the wiping member and rod are removable from the crankcase as a unit for a reading of the oil level on the rod.

7 Claims, 4 Drawing Figures

DEVICE FOR CLEANING OIL DIPSTICKS

BACKGROUND OF THE INVENTION

The present invention relates to a device for cleaning an oil dipstick and has particular application for use with dipsticks as incorporated in internal combustion engines of motor vehicles.

In internal combustion engines and particularly those employed in motor vehicles, and also in certain central heating oil tanks or the like, an oil dipstick extends through a bore formed in the crankcase or tank for emersion in the oil as contained therein. In the usual practice of measuring the oil level in the crankcase or tank, the dipstick is removed from the bore and wiped clean prior to reinsertion thereof for an oil level reading. This cleaning operation of the dipstick before the measurement is usually accomplished by wiping the dipstick with a cloth or suitable absorbent material. Because there is some risk of becoming soiled in removing the dipstick and observing the oil level, this operation is normally carried out by an attendant or workshop personnel; and since maintenance of a predetermined oil level is of critical importance to the life of an internal combustion engine, measurement of the oil levels at periodic intervals is necessary.

Prior to the instant invention, some efforts have been made to incorporate a wiping device as part of the bore through which the dipstick extends, and although some of these prior known devices have accomplished the purpose intended, the materials from which they were constructed, such as felt, fabric, or similar absorbent materials, resulted in relatively short-term use thereof that required replacement parts. Other more complicated self-wiping devices have also been utilized, but have been costly in the construction and maintenance thereof. Some prior known devices are represented in the following patents: U.S. Pat. Nos. 1,747,100; 2,029,672; 2,634,445; 3,686,702 and 3,703,038 and German Pat. No. 1,023,599.

SUMMARY OF THE INVENTION

The present invention relates to an oil dipstick for use in measuring oil level in an oil receiving chamber as formed in a housing and includes an elongated rod on the outermost end of which a handle is formed. A wiping member is removably received in a bore as formed in the casing, the rod slidably extending through the wiping member in frictional contact therewith and being movable outwardly of said casing relative to the wiping member, wherein oil is removed therefrom by contact with the wiping member. A locking member is secured to the rod and is engageable with the wiping member for selectively locking the wiping member to the rod, so that the wiping member and the rod are removable from the bore as a unit for a reading of the oil level on the rod. The locking member includes a lever on which a hook elememt is formed, the wiping member having means for receiving the hook element in locking engagement for securing the wiping member to the rod, the lever being pivotally movable to release the rod from said wiping member for movement relative thereto.

Accordingly, it is an object of the invention to provide a device for cleaning oil dipsticks which enables the measurement of oil level within a casing to be carried out without the use of an auxilliary cleaning medium and without the danger of the user soiling his hands or clothing in the oil level reading operation.

DESCRIPTION OF THE DRAWINGS

In the drawings which illustrate the best mode presently contemplated for carrying out the present invention.

DESCRIPTION OF THE INVENTION

Figure 2:
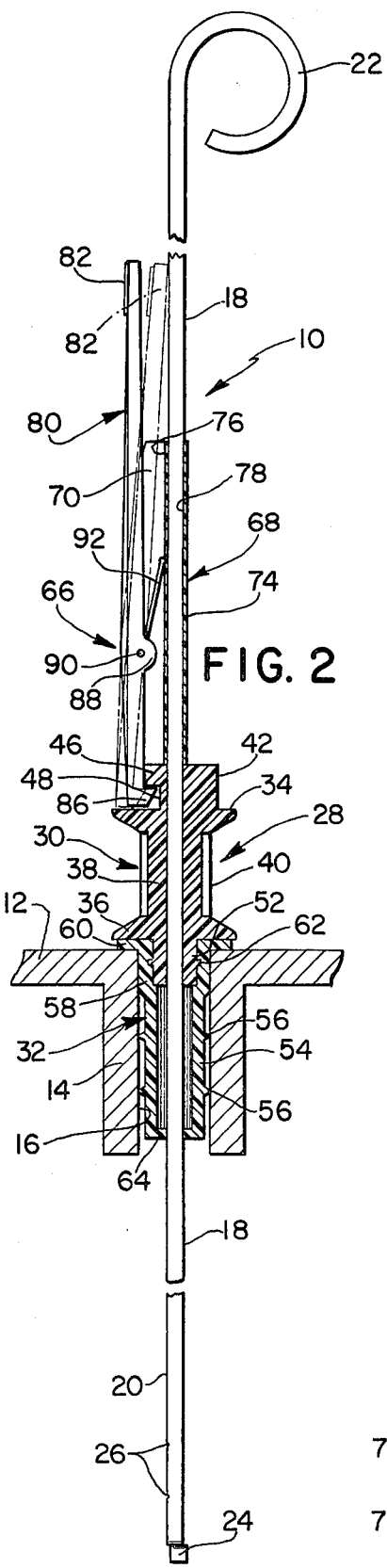
FIG. 2 is a sectional view of the oil dipstick embodied herein as normally located in a bore formed in a casing in which oil is located.
Figure 3:
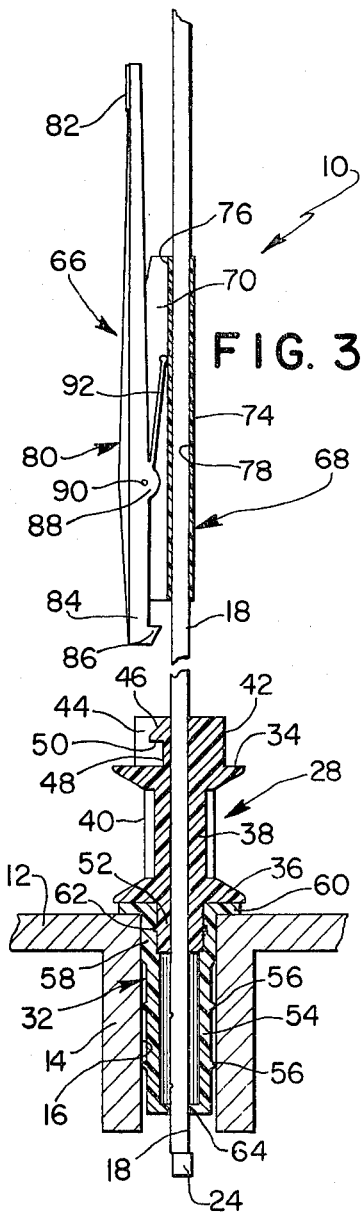
FIG. 3 is a view similar to FIG. 2 illustrating the dipstick rod after disengagement thereof from the wiping member during the retracting movement of the rod in carrying out the wiping operation.

Referring now to drawing, the oil dipstick as embodied in the present invention is generally indicated at 10 and as shown is intended for use in the measurement of oil level in the chamber or crankcase of an automotive vehicle or in an oil tank of a central heating unit or the like. As shown in FIGS. 2 and 3, a casing 12 is partially shown and comprises a part of the casing or crankcase of an automotive vehicle or an oil tank. Projecting inwardly from the casing 12 is a tubular extension 14 in which a bore 16 is formed for receiving the dipstick 10 as will be described.

Figure 4:
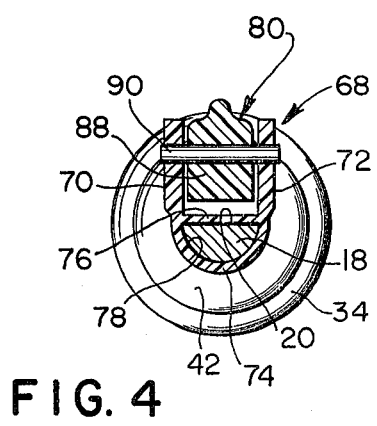
FIG. 4 is a sectional view taken along line 4—4 in FIG. 1.

The dipstick 10 includes an elongated rod 18 having a semispherical configuration which as shown in FIG. 4 defines a flat face 20. Formed on the uppermost end of the elongated rod 18 is a curved handle 22 that is conventional in configuration and provides a finger grip for removing and handling the dipstick 10 during an oil reading operation. The lowermost end of the rod 18 is offset as indicated at 24, the offset portion 24 defining a stop, which prevents removal of the rod 18 from a wiping member which will hereinafter be described. As further indicated in FIG. 1, markings 26 are formed on the flat face 20 of the rod 18 adjacent to the stop 24 and indicate the level of oil in the casing or crankcase in which the dipstick 10 is located.

The primary purpose of the dipstick as embodied in the present invention is to enable a reading of an oil level to be carried out without using a cleaning medium such as a rag or absorbent paper for initially cleaning the lowermost end of the dipstick after it has been extracted from the casing 12. In order to accomplish this purpose, a wiping member generally indicated at 28 is provided. As shown more clearly in FIG. 1, the wiping member 28 includes an upper portion 30 to which a lower portion 32 is joined. The upper and lower portions 30 and 32 of the wiping member 28 are individually formed as illustrated in the drawing, although it is understood that these two portions can be formed in a one-piece construction. The upper portion 30 has a spool-like appearance and includes an upper flange 34 and a lower flange 36 between which a central portion 38 is integrally joined, vertical ribs being spaced around the central portion 38 and extending from the top flange 34 to the bottom flange 36. Integrally joined to the upper flange 34 is a head portion 42 that is generally circular in configuration and that has a diameter somewhat less than the diameter of the flange 34. As shown in FIG. 3, a slot 44 is formed in the head portion 42 and includes a tapered or inclined wall 46 beneath which an undercut recess portion 48 is located that defines a shoulder 50 therewith, the purpose of which will be described hereinafter. Projecting below the lower flange 36 in coaxial relation therewith is a reduced extension 52 that provides for the joining of the upper portion 30 to the lower portion 32. As more clearly illustrated in FIGS. 2 and 3, the lower portion 32 includes a tubular shank 54 having spaced annular ribs 56 formed thereon. Joined to the tubular shank 54 is an enlarged neck portion 58 to which an upper flange 60 is integrally connected. Formed interiorly of the enlarged neck portion 58 is an annular recess that receives an annular rib 62 located on the extension 52 for connecting the upper portion 30 to the lower portion 32. A suitable adhesive may also be used to firmly fix the extension 52 within the tubular shank 54 for joining the upper portion 30 to the lower portion 32. Formed as part of the lower tubular member 54 is a lower end wall 64 in which an opening is located for receiving the rod 18 therethrough. As further illustrated in FIGS. 2 and 3, the rod 18 also slidably extends through an appropriately formed bore that extends axially through the upper portion 30 and the extension 52 projecting therebelow.

As described hereinabove, the lower portion 32 is formed of a deformable or elastic material, such as rubber that will resist deterioration when subject to oil. The elastic material may also be formed of any suitable plastic material that is insoluable in oil and that is sufficiently rigid so as to enable the spaced ribs 56 to firmly locate the wiping member 28 in the bore 16 of the oil crankcase. Although the upper and lower portions 30 and 32 of the wiping member 28 are shown and described hereinabove as being formed separately and joined together, it is contemplated that the wiping member may be formed of a suitable plastic material for molding in a one-piece construction. It is understood that the material will be sufficiently resilient to enable the lower portion to be frictionally received within the bore 16 of the oil crankcase, but the upper portion 30 will also be sufficiently rigid for securement thereof to a locking member, which will be described hereinbelow.

In order to secure the wiping member 28 to the rod 18, a locking member generally indicated at 66 is provided. As shown in the drawing, the locking member 66 includes a U-shaped bracket generally indicated at 68 defined by walls 70 and 72 to which is joined a curved end wall 74. Joined to the side walls 70 and 72 and molded as an integral part thereof, is an interior wall 76 that cooperates with the curved end wall 74 to form a longitudinally extending recess 78. As shown in FIG. 4, the recess 78 has a configuration corresponding to the cross-section of the rod 18 and receives the rod therein. The bracket 68 is preferably molded around the rod 18, and a plurality of small deformations are formed on the rod in the area around which the bracket is molded to fix the bracket on the rod against axial movement.

Located between the side walls 70 and 72 of the bracket 68 is a lever generally indicated at 80 that is formed with a tapered handle portion 82 and a locking portion 84 that terminates in a hook 86. Formed intermediate the handle portion 82 and the locking portion 84 is an enlarged portion 88 that receives a pin 90 for pivotally mounting the lever 80 between the side walls 70 and 72 of the bracket 68. As shown more clearly in FIG. 3, the lever 80 has a spring member 92 formed as an integral part thereof and that extends upwardly from the enlarged portion 88 adjacent to the pivot axis of the lever as represented by the pin 90. The spring member 92 bears against the interior wall 76 and normally urges the hook element 86 into engagement with the shoulder 50 of the upper portion 30 of the wiping member 28, when the rod 18 is moved downwardly relative to the wiping member 28. This relative movement of the rod 18 with respect to the wiping member 28 is facilitated by formation of the upper portion 30 of a plastic material that enables the rod to freely slide within the bore as formed therein.

Figure 1:
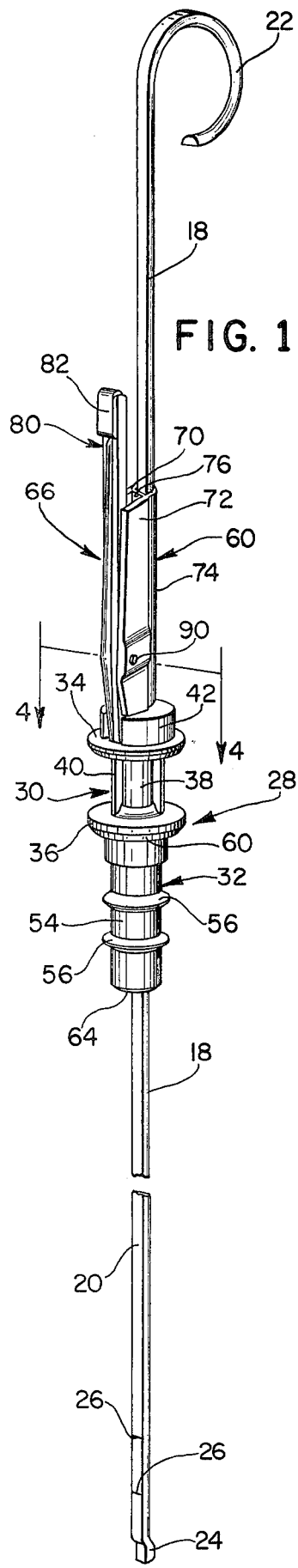
FIG. 1 is a perspective view of the oil dipstick as embodied in the present invention.

In use of the oil dipstick embodied in the present invention, the wiping member 28 is normally mounted in the bore 16 of the casing 12, the rod 18 being located in the position illustrated in FIGS. 1 and 2, wherein the hook 86 is urged into engagement with the shoulder 50 by the spring 92. When an oil reading in the casing 12 is to be taken, the lever 80 is depressed at the handle portion 82 to release the hook 86 from the shoulder 50 of the head portion 30. Simultaneously, the rod 18 is lifted outwardly relative to the wiping member 28, the annular ribs 56 of the lower portion 32 of the wiping member frictionally retaining the wiping member in the bore 16. As the rod 18 moves outwardly relative to the wiping member, the lower surfaces of the rod 18 wipe against the portion of the lower wall 64 immediately adjacent to the opening therein, thereby removing the residual oil located on the lower end of the rod. The rod 18 reaches the upper limit of travel relative to the wiping member 28 when the stop 24 engages the lower end wall 64. At this point, the lower end of the rod 18 has been wiped clean of the oil. The rod 18 is then reinserted into the casing 12 by moving it downwardly relative to the wiping member 28, the hook 86 riding on the inclined wall 46 in the slot 44. When the hook 86 slides off of the inclined wall 46, the spring 92 urges it inwardly into the recess portion 48 for engagement with the shoulder 50. In this position, the rod 18 is now located to the wiping member 28. The entire assembly is then lifted outwardly by the handle 22, the wiping member 28 being forced outwardly of the bore 16 with the rod 18 for a reading of the oil level on the lower end thereof. After the oil level has been determined, the rod 18 and wiping member 28 are reinserted into the bore 16 and pushed downwardly until the flexible lower portion 32 of the wiping member 28 is snugly received within the bore 16.

It is seen that the oil level measurement can be performed with one hand, and there is little danger of soiling hands or clothing of the user, particularly since the oil dipstick is moved essentially in a straight line motion.

Although the rod 18 is illustrated in the drawing as having a semispherical configuration, it is understood that the rod can be formed with a circular cross-sectional configuration. In this event, it is contemplated that the head portion 42 would be formed with an annular shoulder for accommodating the hook 86 regardless of the radial position of the locking member 66 relative to wiping member 28. A straight line movement of the rod 18 would still accomplish the intended purpose as described hereinabove.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An oil dipstick for use in measuring oil level in an oil receiving chamber as formed in a casing, comprising an elongated rod on the outermost end of which a handle is formed, a wiping member removably received in a bore as formed in said casing, said rod slidably extending through said wiping member in frictional contact therewith and being movable outwardly of said casing relative to said wiping member, wherein oil is removed therefrom by contact with said wiping member, and a locking member secured to said rod and engageable with said wiping member for selectively locking said wiping member to said rod, so that the wiping member and rod are removable from said socket as a unit for a reading of the oil level on said rod, said locking member including a pivotally mounted lever on which a hook element is formed, said wiping member having a shoulder formed thereon for receiving said hook element in locking engagement for securing said wiping member to said rod, said lever being pivotally movable to release said rod from said wiping member for movement relative thereto, the portion of said wiping member that extends into said bore being sufficiently flexible to provide for a friction fit therein, a single recess portion formed in the uppermost end of said wiping member, said shoulder being located in said recess portion, the portion of the locking member on which the hook element is formed being dimensioned for extending into said recess portion, wherein said hook element is receivable on said shoulder for locking said wiping member to said rod, said locking member further including a bracket that is molded in fixed relation around said rod and including a longitudinally extending slot that projects entirely through said bracket, wherein said rod extends through said bracket for projection thereabove, said lever being received in said slots in parallel relation to said rod and being pivotally connected to said bracket, the handle as formed on said rod being located substantially above said lever.

2. An oil dipstick as claimed in claim 1, a plurality of ribs formed on the portion of said wiping member that extends into said bore, said ribs engaging the inner walls of said bore for frictionally securing said wiping member therein.

3. An oil dipstick as claimed in claim 1, spring means engaging said lever and normally urging said lever into the locking position thereof.

4. An oil dipstick as claimed in claim 1, said rod being semispherical in cross-section and including a flat surface on which oil level markings are located, said wiping member having a bore formed thereon, the configuration of which corresponds to the cross-section of said rod.

5. An oil dipstick as claimed in claim 4, a stop formed on the lowermost end of said rod and including an offset portion that is offset with respect to the bore formed in said wiping member, wherein said wiping member is prevented from being disengaged from said rod by engagement of said stop with the lowermost end of said wiping member when said rod is retracted relative thereto.

6. An oil dipstick as claimed in claim 1, said hook element as formed on said lever extending beyond the lowermost end of said bracket so as to be exposed for engagement with the shoulder formed on the wiping member.

7. An oil dipstick as claimed in claim 6, said wiping member including an upper portion and a lower portion, said upper portion having said shoulder formed therein for engagement with said hook element, said lower portion having a plurality of annular ribs formed thereon that are frictionally received in said bore for releasably retaining said wiping member therein.

* * * * *